(12) United States Patent
Suzuki et al.

(10) Patent No.: US 7,728,875 B2
(45) Date of Patent: Jun. 1, 2010

(54) IMAGE PROCESSING APPARATUS AND OPERATION CONDITION SETTING METHOD THEREOF

(75) Inventors: Yuji Suzuki, Fukuchiyama (JP); Yutaka Kato, Fukuchiyama (JP)

(73) Assignee: Omron Corporation, Kyoto-Shi (JP)

( * ) Notice: Subject to any disclaimer, the term of this patent is extended or adjusted under 35 U.S.C. 154(b) by 651 days.

(21) Appl. No.: 11/643,686

(22) Filed: Dec. 22, 2006

(65) Prior Publication Data

US 2007/0153102 A1 Jul. 5, 2007

(30) Foreign Application Priority Data

Dec. 29, 2005 (JP) ............................. 2005-380556

(51) Int. Cl.
*H04N 5/232* (2006.01)
(52) U.S. Cl. .............................. 348/211.11; 348/211.9; 348/211.6; 348/211.4; 348/207.1; 348/207.11
(58) Field of Classification Search ........................ None
See application file for complete search history.

(56) References Cited

U.S. PATENT DOCUMENTS

| | | | |
|---|---|---|---|
| 5,627,623 A | 5/1997 | Sasagaki et al. | |
| 5,896,166 A | 4/1999 | D'Alfonso et al. | |
| 6,967,680 B1 | 11/2005 | Kagle et al. | |
| 2002/0101514 A1* | 8/2002 | Watanabe | 348/211 |
| 2003/0120714 A1 | 6/2003 | Wolff et al. | |
| 2004/0223057 A1* | 11/2004 | Oura et al. | 348/207.1 |
| 2006/0061664 A1* | 3/2006 | Ito | 348/211.11 |

FOREIGN PATENT DOCUMENTS

| | | |
|---|---|---|
| EP | 0 509 551 | 10/1992 |
| EP | 0 669 756 | 8/1995 |
| EP | 0 971 529 | 1/2000 |
| JP | 2002-324684 | 11/2002 |
| JP | 2004-158992 | 6/2004 |
| JP | 2004-279911 | 10/2004 |

* cited by examiner

*Primary Examiner*—David L Ometz
*Assistant Examiner*—Angel L Garces-Rivera
(74) *Attorney, Agent, or Firm*—Foley & Lardner LLP

(57) ABSTRACT

An external I/F gives numerical information on an imaging device, input from PC or PLC, to a memory. The memory outputs the numerical information to CPU as well as retaining the numerical information. CPU transmits the numerical information through a camera to an operation control unit. The operation control unit performs correction using a correction value from a correction table. In order to correct a variation individually possessed by a lens unit or an illumination unit, the correction table is previously produced for each lens unit or illumination unit based on the numerical information from the camera. The post-correction control signals are output to a lens unit 62 and an illumination unit.

9 Claims, 13 Drawing Sheets

IMAGE PROCESSING APPARATUS AND OPERATION CONDITION SETTING METHOD THEREOF

This application claims priority from Japanese patent application 2005-380556, filed on Dec. 29, 2005. The entire content of the aforementioned application is incorporated herein by reference.

BACKGROUND OF THE INVENTION

1. Field of the Invention

The present invention relates to an image processing apparatus and a method for setting a operation condition thereof, particularly to the image processing apparatus used in an FA (Factory Automation) line and the method for setting the operation condition thereof.

2. Description of the Related Art

Conventionally, an image processing apparatus (visual sensor) is used to inspect a product on a line in a factory.

FIG. 23 shows a block diagram of a configuration example of a conventional image processing apparatus 800. Referring to FIG. 23, the image processing apparatus 800 includes a controller 20 and an imaging device 60. The imaging device 60 includes a camera 61, a lens unit 62, and an illumination unit 63. Signal cables 81, 811, and 812 through which control signals are transmitted from the controller 20 are provided corresponding to the camera 61, the lens unit 62, and the illumination unit 63 respectively.

Japanese Patent Application Laid-Open No. 2004-279911 discloses a monitoring camera lens device in which a motor is driven based on a control signal from a remotely placed controller and remote operation can be performed by controlling a setting state of an optical component coupled to the motor, and the monitoring camera lens device includes an at-hand handling unit arranged in a main body of the monitoring camera lens device and a control unit in which the motor is driven according to the handling of the at-hand handling unit and the at-hand handling can be performed by controlling the setting state of the optical component.

Japanese Patent Application Laid-Open No. 2002-324684 discloses an illumination control apparatus, wherein a relationship between an input light-control signal and an output light-control signal, obtained through a light-control signal input circuit unit when the output light-control signal is changed in a stepwise manner, is obtained and stored as a correction table in closing a light-control signal short-circuit unit, and the output light-control signal corresponding to the input light-control signal from the light-control signal input circuit unit is determined by referring to the correction table in opening the light-control signal short-circuit unit.

The camera 61 or the illumination unit 63 can be remotely controlled in the conventional image processing apparatus 800 of FIG. 23. However, because a zoom function, a focus function, and an iris function of the lens unit 62 cannot numerically be managed, it is necessary to manually adjust the zoom function, the focus function, the iris function and the like. Specifically, the lens unit 62 is adjusted by rotating a ring like a single-lens reflex camera or by controlling current and voltage while viewing a monitor.

Thus, in the conventional image processing apparatus 800, due to the manual adjustment of the lens unit 62, it is difficult to realize the same setting in the plural lines in FA. It is also difficult to recreate the same setting in replacing the camera 61 and the lens unit 62. Furthermore, in the conventional image processing apparatus 800, even if a user wrongly performs the setting in maintenance, it is difficult to find the wrong setting because parameters such as zoom, focus, and iris cannot numerically be managed in the lens unit 62 of the imaging device 60.

In view of the foregoing, an object of the invention is to provide an image processing apparatus in which the imaging device can numerically be managed and an operation condition setting method thereof.

SUMMARY OF THE INVENTION

An image processing apparatus according to a first aspect of the present invention includes an imaging device and a controller, wherein the imaging device includes a lens unit which has at least one of a zoom function, a focal distance conversion function, and an iris function; an imaging unit which takes an image of a subject through the lens unit; and an operation control unit which receives a setting value from the controller, the operation control unit performing control such that an operation condition of the corresponding function of the lens unit becomes an operation condition according to the setting value, and the controller includes a setting value storage unit in which the setting value for setting the operation condition of the function of the lens unit is stored; and an imaging device interface unit which outputs the setting value stored in the setting value storage unit to the operation control unit of the imaging device.

Further, in the image processing apparatus of the first aspect of the invention, the imaging device further includes an illumination unit which has a function of adjusting a luminance, the operation control unit receives the setting value from the controller and performs the control such that the luminance of the illumination unit becomes an operation condition according to the setting value, and a setting value for setting the luminance of the illumination unit is stored in the setting value storage unit of the controller.

Further, in the image processing apparatus of the first aspect of the invention, the controller includes an interface unit which accepts input of the setting value from the outside.

Further, in the image processing apparatus of the first aspect of the invention, the imaging device further includes a correction table storage unit in which a correction value is stored, the correction value correcting a shift between an operation condition which should be set by the setting value and an operation condition which actually set by the setting value in the imaging device, and the operation control unit corrects the setting value received from the controller based on a correction value stored in the correction table storage unit, the operation control unit controls the operation condition using the corrected setting value, and thereby the operation control unit performs control in the operation condition which should be set by the setting value.

Further, in the image processing apparatus of the first aspect of the invention, the imaging device further includes a correction table storage unit in which a correction value is stored, the correction value correcting a shift between an operation condition which should be set by the setting value and an operation condition which actually set by the setting value in the imaging device, and the imaging device outputs the correction value stored in the correction table storage unit to the controller, the controller receives the correction value stored in the correction table storage unit from the imaging device, and the controller corrects the setting value based on the correction value, and the corrected setting value is output through the imaging device interface unit to the operation control unit of the imaging device.

In the image processing apparatus of the first aspect of the invention, the plural imaging devices are connected to the controller, one or at least two setting values are stored in the setting value storage unit of the controller, and at least one setting value is commonly used as the setting value of at least the two imaging devices connected to the controller. An image processing apparatus according to a second aspect of the present invention includes an imaging device and a controller, wherein the imaging device includes an illumination unit which has a function of adjusting a luminance; an imaging unit which takes an image of a subject; and an operation control unit which receives a setting value from the controller, the operation control unit performing control such that the luminance of the illumination unit becomes an operation condition according to the setting value, and the controller includes a setting value storage unit in which the setting value for setting the luminance of the illumination unit is stored; and an imaging device interface unit which outputs the setting value stored in the setting value storage unit to the operation control unit of the imaging device.

A method for setting an operation condition of a function of a lens unit for an image processing apparatus according to a third aspect of the invention in which an imaging device and a controller are connected to in a separable manner, the imaging device including first and second imaging devices, the imaging device including a lens unit which has at least one of a zoom function, a focal distance conversion function, and an iris function; an imaging unit which takes an image of a subject through the lens unit; and an operation control unit which receives a setting value from the controller, the operation control unit performing control such that an operation condition of the corresponding function of the lens unit becomes an operation condition according to the setting value, and the controller including an interface unit which accepts input of the setting value from the outside; a setting value storage unit in which the setting value for setting the operation condition of the function of the lens unit is stored; and an imaging device interface unit which outputs the setting value stored in the setting value storage unit to the operation control unit of the imaging device, the image processing apparatus operation condition setting method includes a step of inputting the setting value from the outside through the interface unit to store the setting value in the setting value storage unit of the controller while the first imaging device is connected the controller, and of controlling the function of the lens unit of the first imaging device based on the setting value such that the function of the lens unit of the first imaging device becomes the operation condition according to the setting value of the operation condition; a step of disconnecting the connection between the controller and the first imaging device to replace the first imaging device with the second imaging device; a step of controlling the function of the lens unit of the second imaging device such that the function of the lens unit of the second imaging device becomes the operation condition according to the same setting value as the setting value of the operation condition of the function of the lens unit of the first imaging device, the setting value of the operation condition of the function of the lens unit of the first imaging device being recorded in the setting value storage unit of the controller.

Preferably, in the image processing apparatus operation condition setting method of the third aspect of the invention, the imaging device further includes an illumination unit which has a function of adjusting a luminance, the operation control unit receives a setting value from the controller and performs the control such that the luminance of the illumination unit becomes an operation condition according to the setting value, the setting value for setting the luminance of the illumination unit is stored in the setting value storage unit of the controller, and the image processing apparatus operation condition setting method further includes a step of controlling the operation condition of the illumination unit based on the setting value such that the luminance of the illumination unit of the first imaging device becomes the luminance according to the setting value; and a step of controlling the operation condition concerning the luminance of the illumination unit of the second imaging device such that the operation condition concerning the luminance of the illumination unit of the second imaging device becomes the operation condition according to the same setting value as the setting value of the operation condition concerning the luminance of the illumination unit of the first imaging device, the setting value of the operation condition concerning the luminance of the illumination unit of the first imaging device being recorded in the setting value storage unit of the controller.

Preferably, in the image processing apparatus operation condition setting method of the third aspect of invention, the imaging device further includes a correction table storage unit in which a correction value is stored, the correction value correcting a deviation between an operation condition which should be set by the setting value and an operation condition which actually set by the setting value in the imaging device, and the operation control unit corrects the setting value received from the controller based on a correction value stored in the correction table storage unit, and the operation control unit controls the operation condition using the corrected setting value.

Preferably, in the image processing apparatus operation condition setting method of the third aspect of the invention, the imaging device further includes a correction table storage unit in which a correction value is stored, the correction value correcting a deviation between an operation condition which should be set by the setting value and an operation condition which actually set by the setting value in the imaging device, and the imaging device outputs the correction value stored in the correction table storage unit to the controller, the controller receives the correction value stored in the correction table storage unit from the imaging device, and the controller corrects the setting value based on the correction value, and the corrected setting value is output through the imaging device interface unit to the operation control unit of the imaging device.

According to the invention, the imaging device can numerically be managed.

DETAILED DESCRIPTION OF THE PREFERRED EMBODIMENTS

Preferred embodiments of the invention will be described below in detail with reference to the drawings. In the following drawings, the same or corresponding component is designated by the same numeral, and repetition of the description will be neglected.

Figure 1:
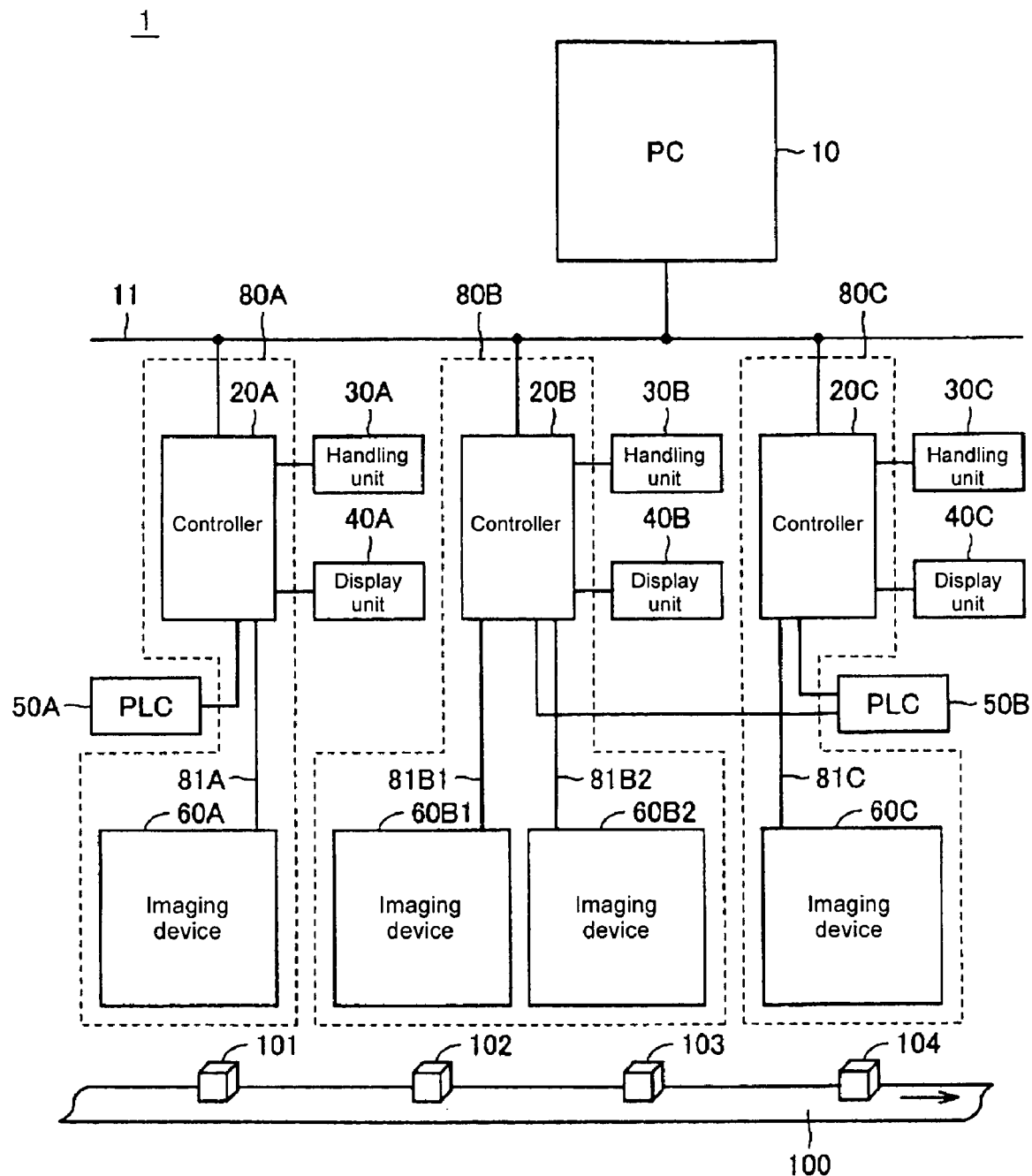
FIG. 1 shows a block diagram of a schematic configuration of a sensor system 1 according to an embodiment of the invention.

FIG. 1 shows a block diagram of a schematic configuration of a sensor system 1 according to an embodiment of the invention.

Referring to FIG. 1, the sensor system 1 is used to inspect products 101 to 104 conveyed in a production site such as a production line 100. The products 101 to 104 are a finished product or a semifinished product. The sensor system 1 includes PC (personal computer) 10, a network line 11, handling units 30A to 30C, display units 40A to 40C, PLCs (programmable controller) 50A and 50B, and pieces of image processing apparatus 80A to 80C. Each of the pieces of processing apparatus 80A to 80C corresponds to the image processing apparatus according to the embodiment of the invention.

PC 10 transmits and receives information to and from the pieces of image processing apparatus 80A to 80C through the network line 11. For example, the network line 11 is a line for LAN (Local Area Network). An operator can monitor an operating status of the production line 100 and remotely operate the pieces of image processing apparatus 80A to 80C using PC 10.

In FIG. 1, the image processing apparatus 80A takes an image of the product 101. Similarly the image processing apparatus 80B takes the images of the products 102 and 103, and the image processing apparatus 80C takes the image of the product 104. The pieces of image processing apparatus 80A to 80C output comparison results by comparing previously stored image patterns (image information) and pieces of information on the taken images.

PLC 50A receives the comparison result from the image processing apparatus 80A. PLC 50B receives the comparison result from the image processing apparatus 80B and 80C. In these comparison results, the stored image information is not matched with the information obtained by taking the image, when color shading or flaw is generated in the products 101 to 104. On the basis of the comparison results, PLCs 50A and 50B determine whether the products 101 to 104 are delivered to the next process or the products 101 to 104 are discharged from the production line 100.

Each of the pieces of image processing apparatus 80A to 80C includes a controller and an imaging device. The controller corresponds to "main body unit" in the image processing apparatus of the invention. In FIG. 1, the image processing apparatus 80A includes a controller 20A and an imaging device 60A. The image processing apparatus 80B includes a controller 20B and imaging devices 60B1 and 60B2. The image processing apparatus 80C includes a controller 20C and an imaging device 60C. In image processing apparatus of the embodiment, like the image processing apparatus 80B, the plural imaging devices (imaging devices 60B1 and 60B2) may be provided with respect to the one controller (controller 20B). Each of the controllers 20A to 20C is connected to the network line 11.

Each of the pieces of image processing apparatus 80A to 80C further includes a signal cable through which the signal is transmitted between the controller and the imaging device. The image processing apparatus 80A includes a signal cable 81A. Similarly the image processing apparatus 80B further includes signal cable 81B1 and 81B2, and the image processing apparatus 80C further includes a signal cable 81C. The controller and the imaging device are connected through the signal cable by a connector. A terminal base may be detachably attached in place of the connector. A configuration of the signal cable will be described later.

The handling units 30A to 30C are connected to the controllers 20A to 20C respectively. The display units 40A to 40C are also connected to the controllers 20A to 20C respectively. For example, a mouse and keyboard are used as the handling unit 30A to 30C. For example, a liquid crystal display is used as the display unit 40A to 40C. A user performs the imaging device setting using the display unit or the handling unit. The information on the imaging device setting is transmitted from the controller to the imaging device through the signal cable. The imaging device changes the zoom magnification of the lens, the shutter speed, and the like in response to the information on the imaging device setting.

Then, the configurations of the pieces of image processing apparatus 80A to 80C will be described. Basically the pieces of image processing apparatus 80A to 80C have the same configuration, the controllers 20A to 20C have the same configuration, and the imaging devices 60A, 60B1, 60B2, and 60C have the same configuration, and the signal cables 81A, 81B1, 81B2, and 81C have the same configuration. Therefore, in the following description, the pieces of image processing apparatus 80A to 80C are collectively called "image processing apparatus 80", the controllers 20A to 20C are collectively called "controller 20", the imaging devices 60A, 60B1, 60B2, and 60C are collectively called "imaging device 60", and the signal cables 81A, 81B1, 81B2, and 81C are collectively called "signal cable 81".

Figure 2:
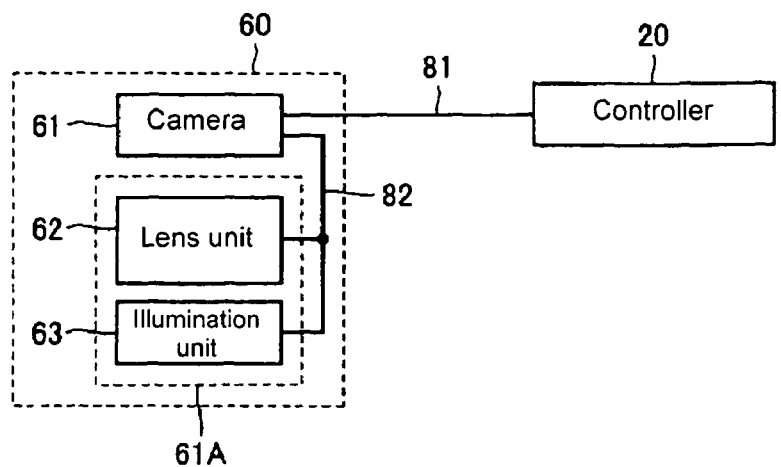
FIG. 2 shows a block diagram of a schematic configuration of an image processing apparatus 80 according to the embodiment of the invention.

FIG. 2 shows a block diagram of a schematic configuration of the image processing apparatus 80 of the embodiment.

Referring to FIG. 2, the image processing apparatus 80 includes the controller 20, the imaging device 60, and the signal cable 81. The imaging device 60 includes a camera 61, an assist unit 61A, and a signal cable 82. The assist unit 61A includes a lens unit 62 and an illumination unit 63. The camera 61 is a device which takes the image of the product (subject) shown in FIG. 1 through the lens unit 62. The lens unit 62 has at least one of a zoom function, a focal distance conversion function, and an iris function. The illumination unit 63 irradiates a subject with light.

The controller 20 transmits a control signal to the camera 61 through the signal cable 81 to control the lens unit 62 and the illumination unit 63. The camera 61 transmits an instruction signal to the lens unit 62 or illumination unit 63 through a signal cable 82, when the signal received from the controller 20 is the signal for controlling the lens unit 62 or the illumination unit 63. The lens unit 62 or the illumination unit 63 is operated according to the received instruction signal.

Figure 22:
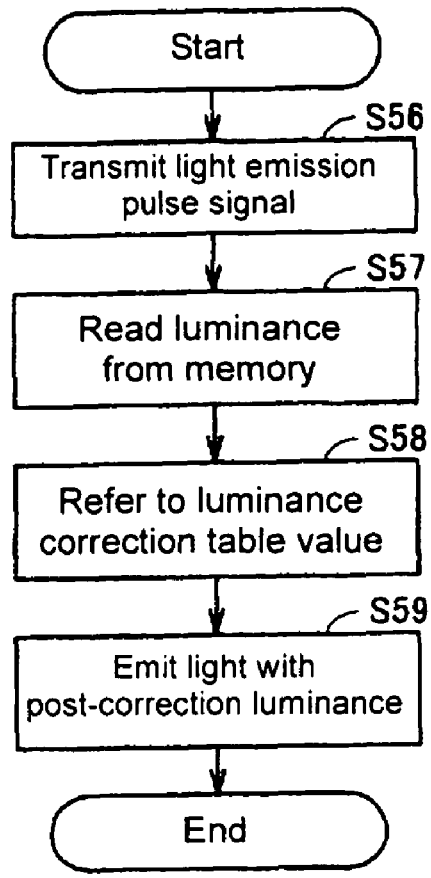
FIG. 22 shows a flowchart of an operation in the case where the illumination unit 63 is driven based on the luminance correction table value.
Figure 23:
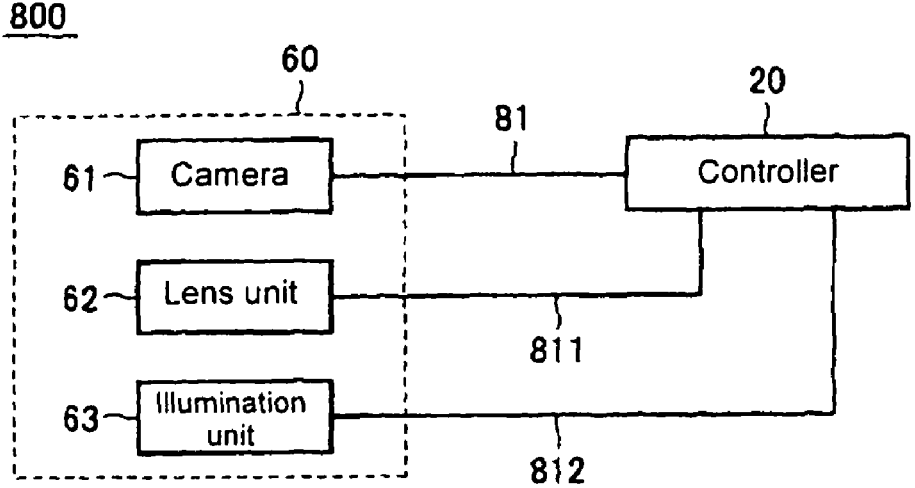
FIG. 23 shows a block diagram of a configuration example of a conventional image processing apparatus 800.

In the conventional image processing apparatus 800 shown in FIG. 22, the signal cables 811 and 812 are required for the lens unit 62 and the illumination unit 63 in order that the controller 20 controls the lens unit 62 and the illumination unit 63. On the other hand, in the image processing apparatus 80 of the embodiment, only the signal cable 81 is connected to the controller 20. Therefore, according to the embodiment, the lens unit and illumination unit which are simultaneously used along with the FA camera can remotely be controlled through the compact wiring.

The camera 61 also receives the control signal for controlling the camera 61 of itself from the controller 20. In this case, for example, the camera 61 changes the shutter speed based on the received control signal. The camera 61 and the assist unit 61A may directly be connected by a male connector and a female connector without using the signal cable 82 shown in FIG. 2.

Figure 3:
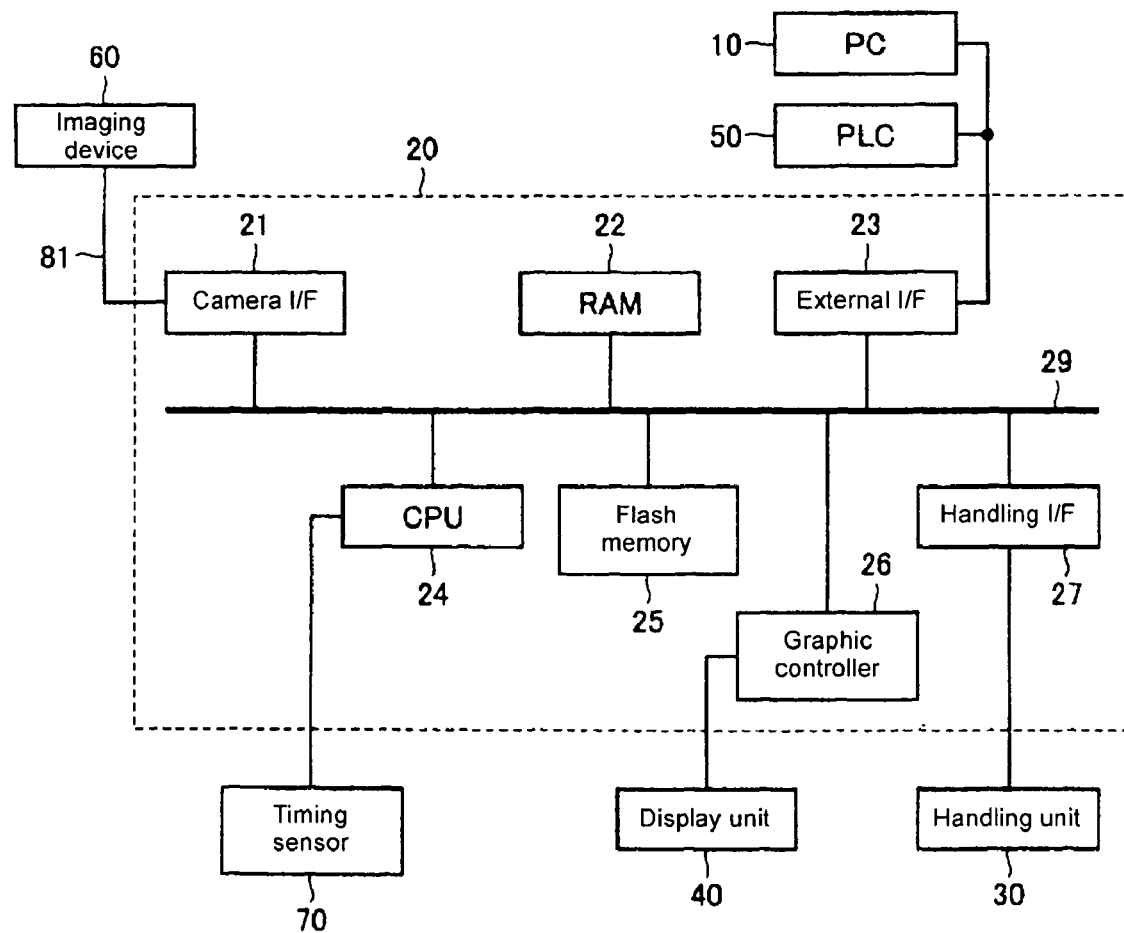
FIG. 3 shows a block diagram of a configuration of a controller 20 of FIG. 2 and a periphery thereof.

FIG. 3 shows a block diagram of a configuration of the controller 20 of FIG. 2 and the periphery thereof. Referring to FIG. 3, the controller 20 includes a camera I/F (interface) 21, RAM (volatile memory) 22, an external I/F 23, CPU (Central Processing Unit) 24, a flash memory 25, a graphic controller 26, a handling I/F 27, and an internal bus 29.

A timing sensor 70 (not shown in FIG. 1) is a photo sensor placed in the production line 100 of FIG. 1. When the product passes through a point at which the timing sensor 70 is placed, the timing sensor 70 transmits a timing signal to CPU 24. CPU 24 outputs an imaging instruction to the imaging device 60 in response to the timing signal. CPU 24 performs a predetermined process according to the image information received from the imaging device 60. CPU 24 controls the whole operation of the controller 20.

In the controller 20, the camera I/F 21 is a circuit which conducts communication with the imaging device 60. The image information received by the camera I/F 21 is tentatively stored in RAM 22, and data necessary for various processes performed by CPU 24 is tentatively stored in RAM 22. A program executed by CPU 24, parameters which should be stored, and the like are stored in the flash memory 25 in a non-volatile manner. The graphic controller 26 outputs the image information to the display unit 40 in order that the display unit 40 displays the image information from the imaging device 60 or the image information already processed by CPU 24.

The external I/F 23 gives the information input from PC 10 or PLC 50 to CPU 24. The handling I/F 27 is connected to the handling unit 30 to receive the information which is output from the handling unit 30 according to the user's operation. The information is transmitted from the handling I/F 27 to CPU 24. In the controller 20, these pieces of information are transmitted through the internal bus 29.

Figure 4:
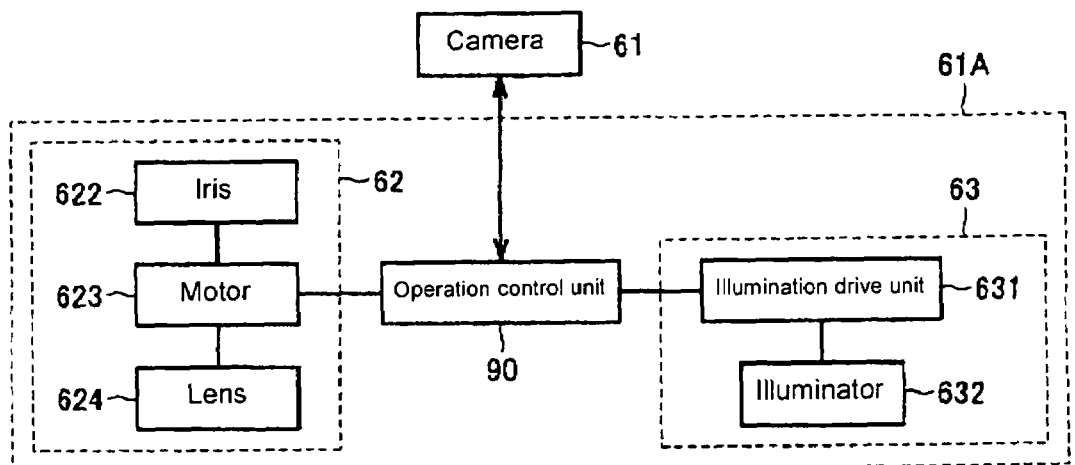
FIG. 4 shows a block diagram of a configuration of an imaging device 60 of FIG. 2.

FIG. 4 shows a block diagram of a configuration of the imaging device 60 of FIG. 2. Referring to FIG. 4, the imaging device 60 includes the camera 61 and the assist unit 61A. The assist unit 61A includes the lens unit 62, the illumination unit 63, and an operation control unit 90. The operation control unit 90 controls the operation of a motor 623 or an illumination drive unit 631 according to contents of communication with the camera 61. Therefore, the operations of an iris 622, a lens 624, and an illuminator 632 are controlled respectively.

The lens unit 62 includes the iris 622, the motor 623, and the lens 624. The iris 622 changes an aperture diameter using the motor 623. The lens 624 changes the zoom magnification or the focus using the motor 623. Therefore, the zoom function, the focal distance conversion function, and the iris function which are possessed by the lens unit 62 can be realized.

The illumination unit 63 includes an illumination drive unit 631 and an illuminator 632. The illuminator 632 illuminates subjects (products 101 to 104 of FIG. 1) according to the control of the illumination drive unit 631. For example, the illuminator 632 is formed by a light emitting device such as LED (Light Emitting Diode) or a fluorescent lamp. For example, the illumination drive unit 631 is formed by a circuit for applying drive current to LED or a circuit for lighting on the fluorescent lamp.

Figure 5:
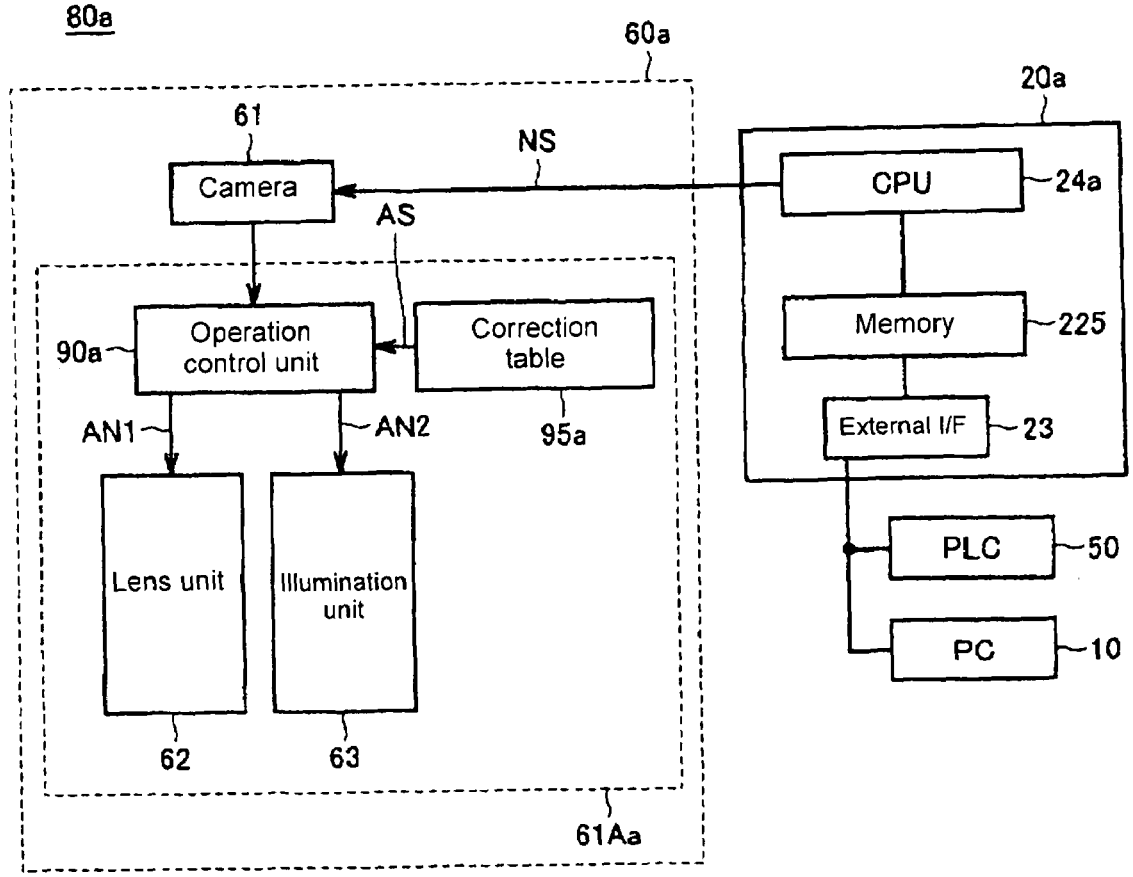
FIG. 5 shows a block diagram of a schematic configuration of an image processing apparatus 80a which is an example of the image processing apparatus 80 of FIG. 2.

FIG. 5 shows a block diagram of a schematic configuration of an image processing apparatus 80a which is an example of the image processing apparatus 80 of FIG. 2.

Referring to FIG. 5, the image processing apparatus 80a includes a controller 20a and an imaging device 60a. The controller 20a includes CPU 24a, a memory 225, and the external I/F 23. The memory 225 is a memory in which RAM 22 and the flash memory 25 of FIG. 2 are collectively called. The imaging device 60a includes the camera 61 and an assist unit 61Aa. The assist unit 61Aa includes the lens unit 62, the illumination unit 63, an operation control unit 90a, and a correction table 95a.

The external I/F 23 gives numerical information NS on the imaging device 60a, input from PC 10 or PLC 50, to the memory 225. The numerical information NS means a setting value such as the zoom magnification, iris value, and focal distance value (the value corresponding to the focal distance value, including, for example the lens position) of the lens unit and a value corresponding to luminance of the illumination unit. The numerical information NS is stored in the memory 225, and the numerical information NS is output to CPU 24a. CPU 24a transmits the numerical information NS to the operation control unit 90a through the camera 61. In order to correct a variation individually possessed by the lens unit or illumination unit, the operation control unit 90a performs correction using a correction value AS from each correction table 95a which is previously produced based on the numerical information NS from the camera 61. Post-correction control signals AN1 and AN2 are output to the lens unit 62 and the illumination unit 63 respectively.

Figure 6:
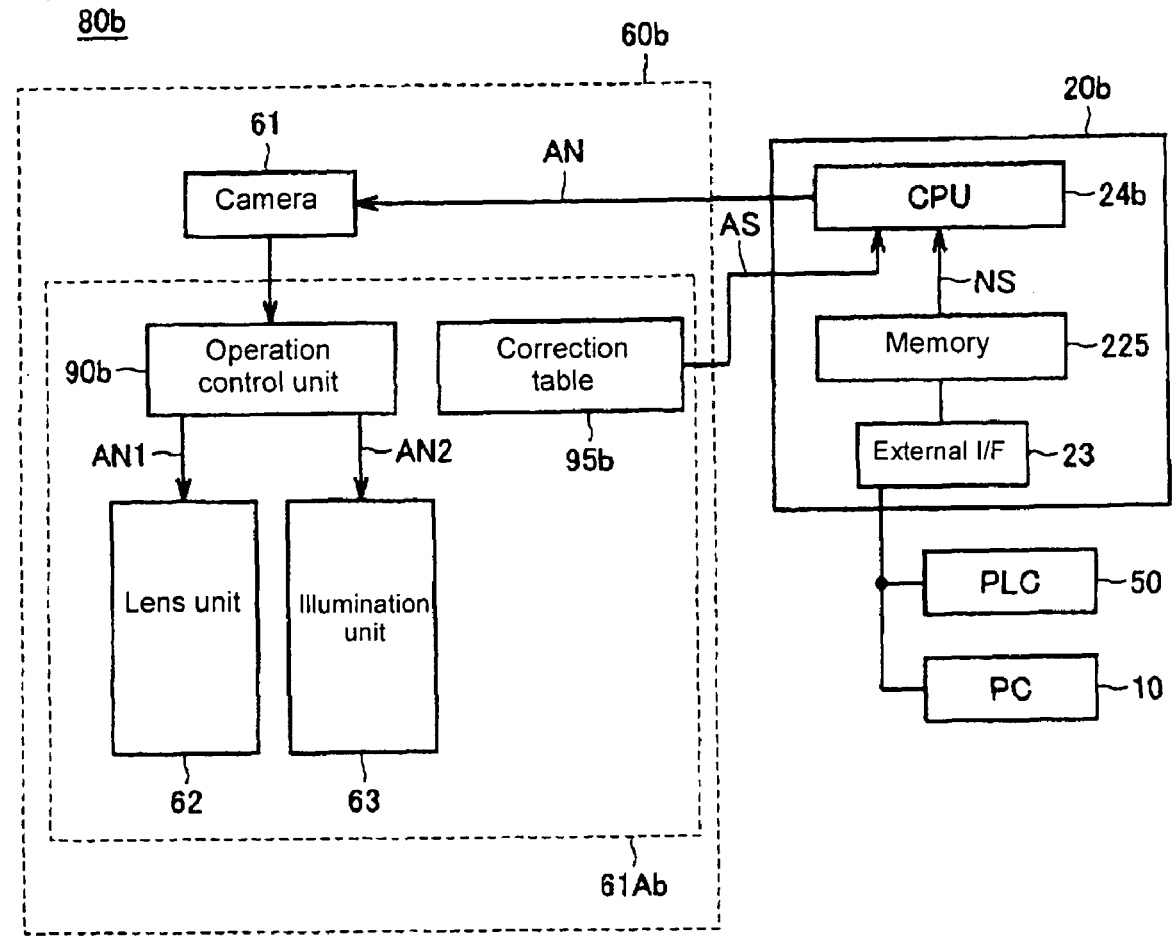
FIG. 6 shows a block diagram of a schematic configuration of an image processing apparatus 80b which is another example of the image processing apparatus 80 of FIG. 2.

FIG. 6 shows a block diagram of a schematic configuration of an image processing apparatus 80b which is another example of the image processing apparatus 80 of FIG. 2.

Referring to FIG. 6, the image processing apparatus 80b includes a controller 20b and an imaging device 60b. The controller 20b includes CPU 24b, the memory 225, and the external I/F 23. The imaging device 60b includes the camera 61 and an assist unit 61Ab. The assist unit 61Ab includes the lens unit 62 the illumination unit 63, an operation control unit 90b, and a correction table 95b.

The external I/F 23 gives the numerical information NS on the imaging device 60b, input from the PC 10 or PLC 50, to the memory 225. The numerical information NS is stored in the imaging device 60b, and the numerical information NS is output to CPU 24b. CPU 24b corrects the numerical information NS from the memory 225 using the correction value AS from the correction table 95b, and CPU 24b transmits the post-correction control signal AN to the operation control unit 90b through the camera 61. The operation control unit 90b outputs post-correction control signals AN1 and AN2 to the lens unit 62 and the illumination unit 63 respectively. Therefore, even if the lens unit or the illumination unit individually possesses the variation in characteristics, the lens unit or the illumination unit can be set at the state in which the characteristics are exerted according to the setting value.

The image processing apparatus 80 is configured as shown in FIGS. 5 and 6, which allows the imaging device 60 to be numerically managed. Specifically, as shown in FIG. 1, in the case where the plural imaging devices 60A, 60B1, 60B2, and 60C are placed, the same setting value can also be used for each of the plural imaging devices. For example, one or at least two setting values are input through the external I/F 23, the setting values are stored in the memory 225 of the controller 20, and at least one of the setting values is commonly used as the setting value of at least two imaging devices connected to the controller 20. Therefore, the same setting value can be used for each of the plural imaging devices. In the case where the imaging device 60 is replaced with another imaging device, the same setting as the pre-replacing setting can be applied by utilizing the setting value previously stored in the memory 225.

The specific operation performed by the image processing apparatus 80 of the embodiment will be described below with reference to flowcharts.

Figure 7:
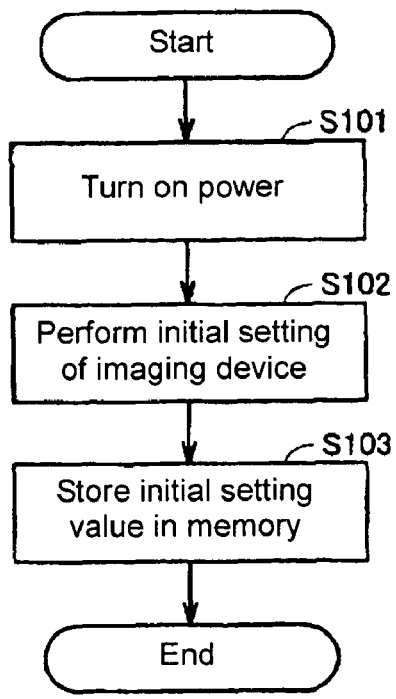
FIG. 7 shows a flowchart of an operation of CPU 24 in a setting mode of the controller 20.

FIG. 7 shows a flowchart of the operation of CPU 24 in a setting mode of the controller 20.

Referring to FIG. 7, the image processing apparatus 80 is turned on in Step S101. In Step S102, an initial setting is performed to the imaging device 60. Specifically, for example, a gain and the shutter speed of the camera 61, the zoom, focus, and iris settings of the lens unit 62, and a luminance setting of each divided illumination unit 63 are initially set. As described above, these initial setting values can be input by a user through the external I/F 23 or handling I/F 27 of FIG. 3. The initial setting values are stored in the memory 225 in Step S103, and then the operation of the setting mode is ended.

Figure 8:
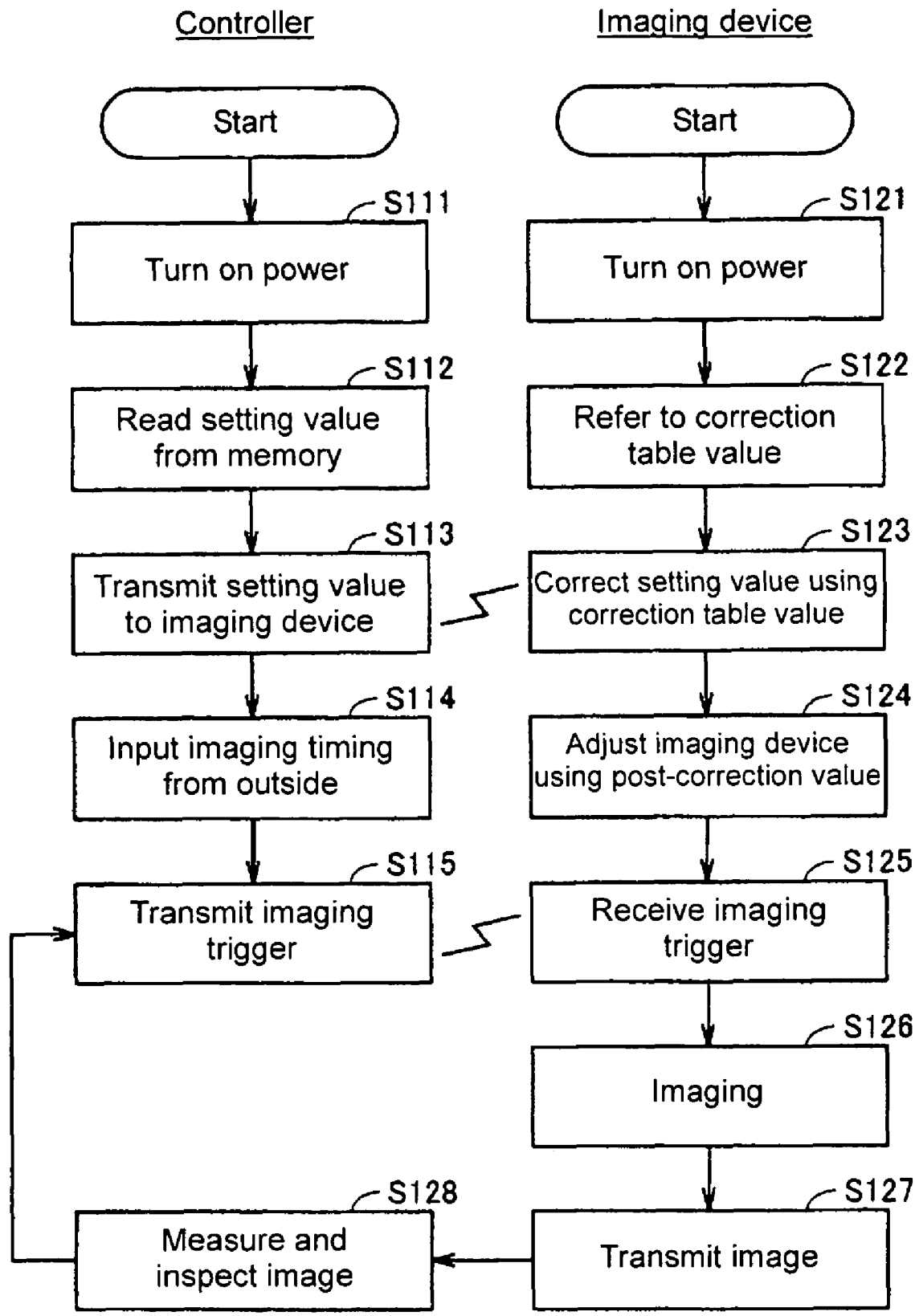
FIG. 8 shows a flowchart of operations of the controller 20a and an imaging device 60a in an operating mode of the image processing apparatus 80a of FIG. 5.

FIG. 8 shows a flowchart of the operations of the controller 20a and the imaging device 60a in an operating mode of the image processing apparatus 80a of FIG. 5.

Referring to FIG. 8, in Step S11 and S121, the controller 20a and the imaging device 60a are turned on respectively. The controller 20a reads the setting value, input from the outside, from the memory 225 in Step S112. The controller 20a transmits the setting value to the imaging device 60a in Step S113. The imaging device 60a refers to the correction value from the correction table 95 in Step S122. Then, in Step S123, the imaging device 60a receives the setting value transmitted from the controller 20a, and the imaging device 60a corrects the setting value using the correction value of the correction table 95a. In Step S124, the imaging device 60a is adjusted with the post-correction value.

The controller 20a receives the input of imaging timing from the outside in Step S114, and the controller 20a transmits an imaging trigger to the imaging device 60a in Step S115. The imaging device 60a receives the imaging trigger from the controller 20a in Step S125, and the imaging device 60a performs an imaging operation in Step S126. Then, in Step S127, the imaging device 60a transmits the image obtained by the imaging operation to the controller 20a. In Step S128, the controller 20a measures and inspects the image from the imaging device 60a, and the controller 20a performs feedback of the results to Step S115. In response to the feedback, the controller 20a transmits the imaging trigger to the imaging device 60a again in Step S115.

Figure 9:
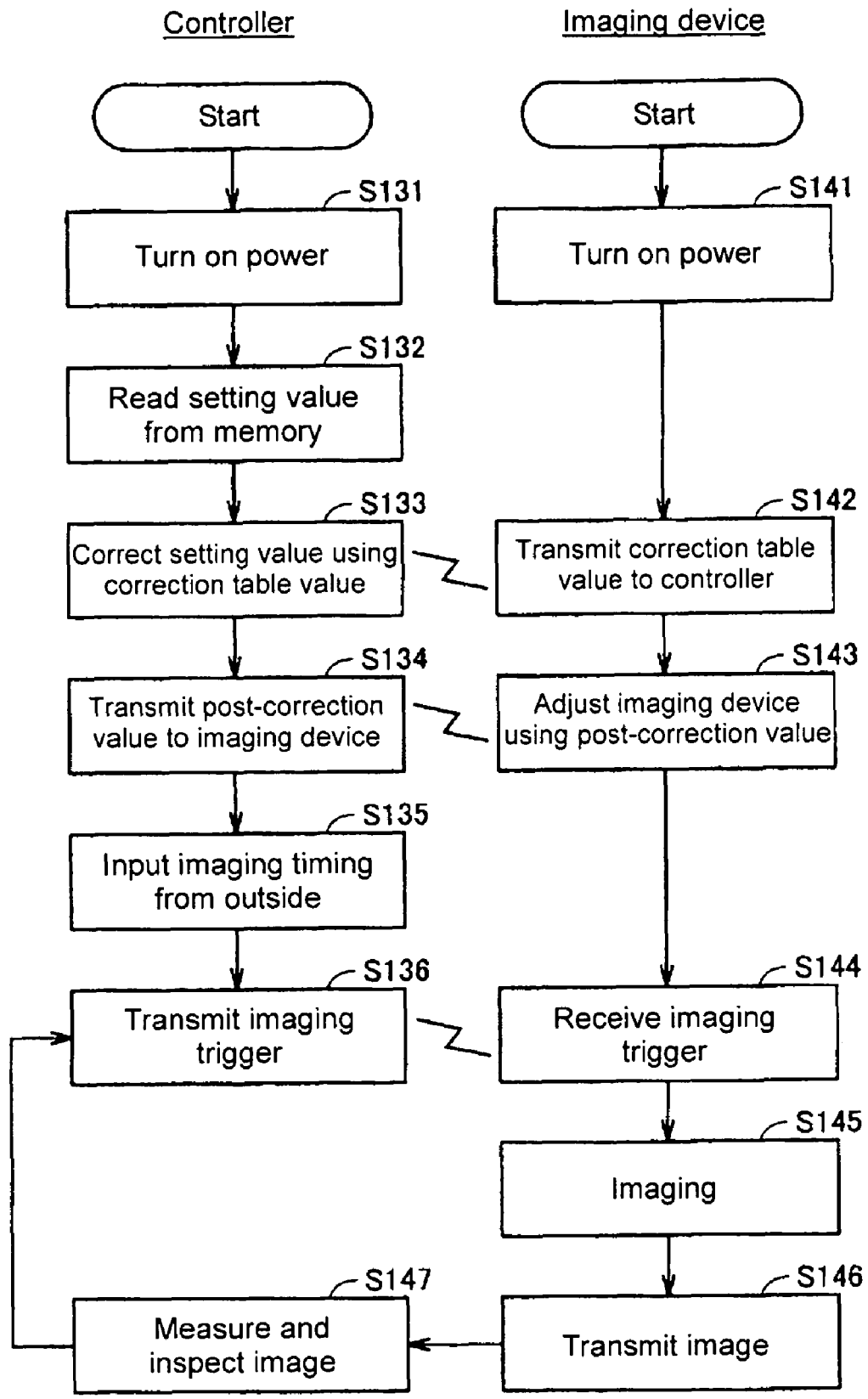
FIG. 9 shows a flowchart of operations of the controller 20b and an imaging device 60b in an operating mode of the image processing apparatus 80b of FIG. 6.

FIG. 9 shows a flowchart of the operations of the controller 20b and the imaging device 60b in an operating mode of the image processing apparatus 80b of FIG. 6.

Referring to FIG. 9, in Step S131 and S141, the controller 20b and the imaging device 60b are turned on respectively. The controller 20b reads the setting value, input from the outside, from the memory 225 in Step S132. In Step S142, the imaging device 60b reads the correction value from the correction table 95b and transmits the setting value to the controller 20b. Then, in Step S133, the controller 20b receives the setting value transmitted from the imaging device 60b, and the controller 20b corrects the setting value using the correction value of the correction table 95b. In Step S134, the controller 20b transmits the post-correction value to the imaging device 60b. In Step S143, the imaging device 60b is adjusted using the post-correction value.

The controller 20b receives the input of the imaging timing from the outside in Step S135, and the controller 20b transmits the imaging trigger to the imaging device 60b in Step S136. The imaging device 60b receives the imaging trigger from the controller 20b in Step S144, and the imaging device 60b performs the imaging operation in Step S145. Then, in Step S146, the imaging device 60b transmits the image obtained by the imaging operation to the controller 20b. In Step S147, the controller 20b measures and inspects the image from the imaging device 60b, and the controller 20b performs the feedback of the results to Step S136. In response to the feedback, the controller 20b transmits the imaging trigger to the imaging device 60b again in Step S136.

The zoom, focus, and iris settings in the lens unit 62 of the imaging device 60, and the luminance setting in the illumination unit 63 will be described in detail with reference to the drawings. Hereinafter the correction table 95a and the correction table 95b are collectively called correction table 95.

Figure 10:
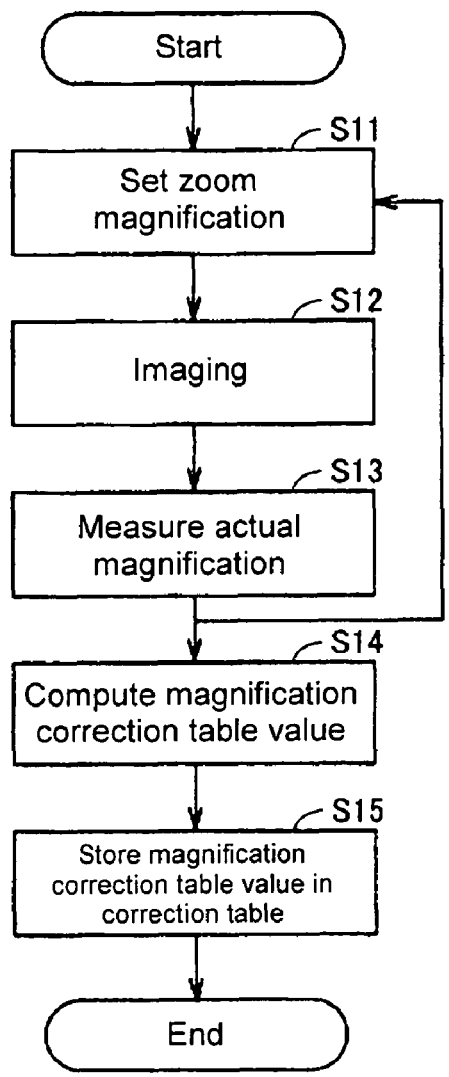
FIG. 10 shows a flowchart of an operation in the case where a zoom magnification correction table value is previously set in a lens unit 62.

FIG. 10 shows a flowchart of an operation in the case where a zoom magnification correction table value is previously set in the lens unit 62. The setting of the correction table is performed after the lens unit is produced, or before the product is shipped.

Referring to FIG. 10, the zoom magnification of the lens unit 62 is set in Step S11, and the image is taken with the camera 61 in Step S12. Then, the actual magnification of the lens unit 62 is measured in Step S13, and the flow returns to Step S11. The setting magnification and the actual magnification can be sampled at plural points by repeating the operations of Step S11 to S13. The magnification correction table value is computed based on the sampling points in Step S14, and the magnification correction table value is stored in the correction table 95 in Step S15.

Figure 11:
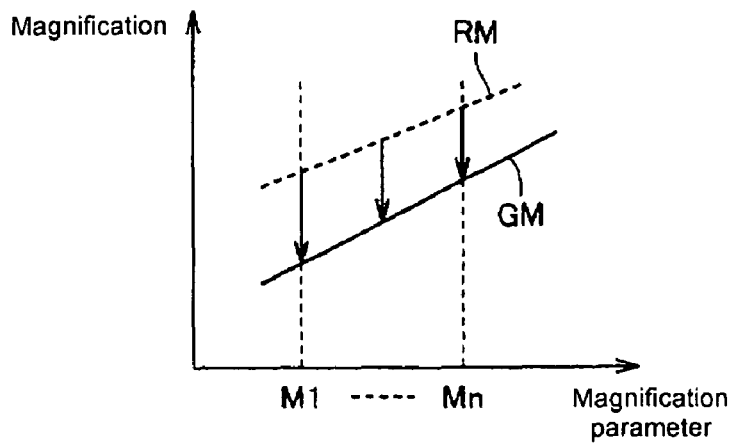
FIG. 11 shows an example in which the zoom magnification correction table value is computed in Step S14 of FIG. 10.

FIG. 11 shows an example in which the zoom magnification correction table value is computed in Step S14 of FIG. 10.

In FIG. 11, a horizontal axis indicates a magnification parameter while a vertical axis indicates a magnification. An actual magnification RM corresponding to a setting magnification GM is measured in each of sampling points M1 to Mn, and linear or curved interpolation is performed between the setting magnification GM and the actual magnification RM. The magnification correction table value can be computed (Step S14) by computing a difference between the setting magnification GM and the actual magnification RM. In FIG. 11, an offset value between the setting magnification GM and the actual magnification RM becomes the magnification correction table value.

Figure 12:
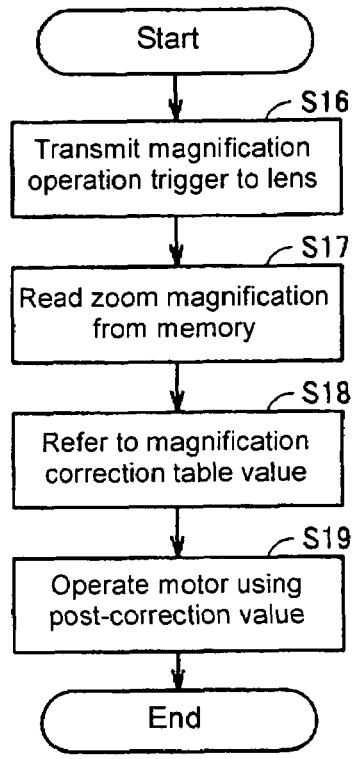
FIG. 12 shows a flowchart of an operation in the case where the lens unit 62 is driven based on the zoom magnification correction table value.

FIG. 12 shows a flowchart of an operation in the case where the lens unit 62 is driven based on the zoom magnification correction table value.

Referring to FIG. 12, the controller 20 transmits the trigger signal of the magnification operation to the lens unit 62 of the imaging device 60 in Step S16, and the controller 20 reads the zoom magnification from the memory 225 in Step S17. The user can input the zoom magnification through the external I/F 23 or handling I/F 27 of FIG. 3. Then, in Step S18, the controller 20 or the imaging device 60 refers to the magnification correction table value corresponding to the zoom magnification from the correction table 95. In Step S19, the operation control unit 90 drives the motor 623 such that the lens unit 62 becomes the post-correction magnification value.

Therefore, even if the zoom magnification actually realized by the zoom magnification setting value is shifted due to the variation in characteristics of the lens unit, the zoom magnification which should originally be set as well as the zoom magnification is set is actually obtained by the correction process.

Figure 13:
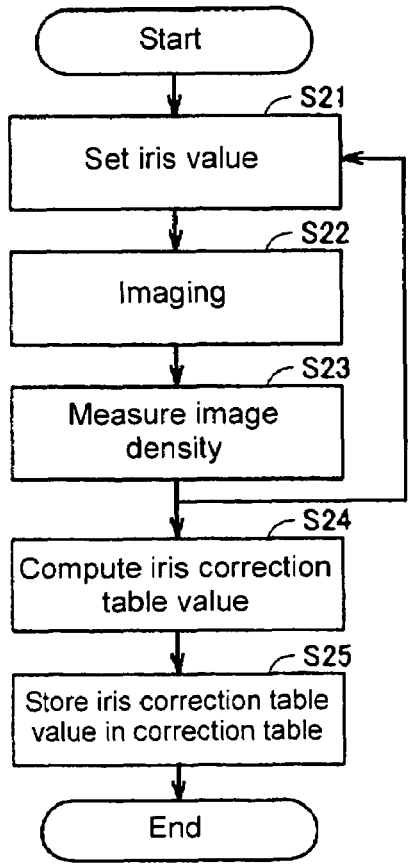
FIG. 13 shows a flowchart of an operation in the case where an iris correction table value is previously set in the lens unit 62.

FIG. 13 shows a flowchart of an operation in the case where an iris correction table value is previously set in the lens unit 62.

Referring to FIG. 13, an iris value of the lens unit 62 is set in Step S21, and the image is taken with the camera 61 in Step S22. Then, density of the image taken with the camera 61 is measured in Step S23, and the flow returns to Step S21. The conversion density and measured density can be sampled at plural points by repeating the operations of Step S21 to S23. The iris correction table value is computed based on the sampling points in Step S24, and the iris correction table value is stored in the correction table 95 in Step S25.

Figure 14:
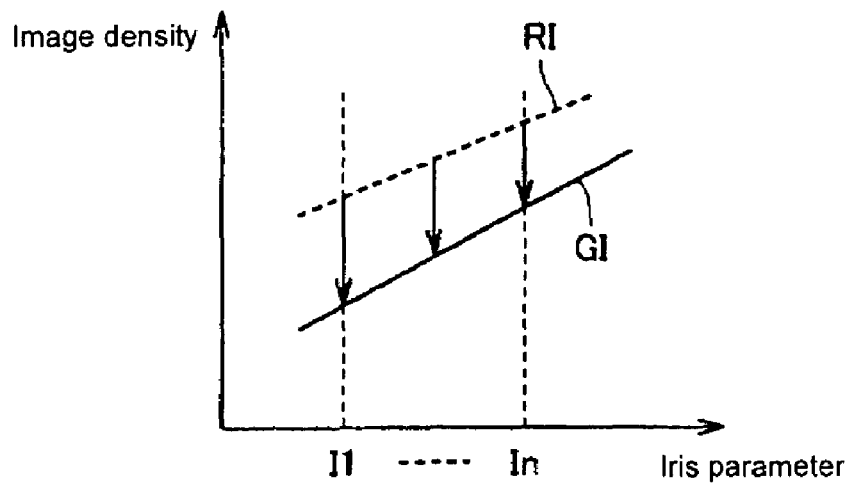
FIG. 14 shows an example in which the iris correction table value is computed in Step S24 of FIG. 13.

FIG. 14 shows an example in which the iris correction table value is computed in Step S24 of FIG. 13.

In FIG. 14, a horizontal axis indicates an iris parameter while a vertical axis indicates image density. A measured density RI corresponding to a conversion density GI of the setting iris value is measured in each of sampling points I1 to In, and the linear or curved interpolation is performed between the conversion density GI and the measured density RI. The iris correction table value can be computed (Step S24) by computing a difference between the conversion density GI and the measured density RI. In FIG. 14, an offset value between the conversion density GI and the measured density RI becomes the iris correction table value.

Figure 15:
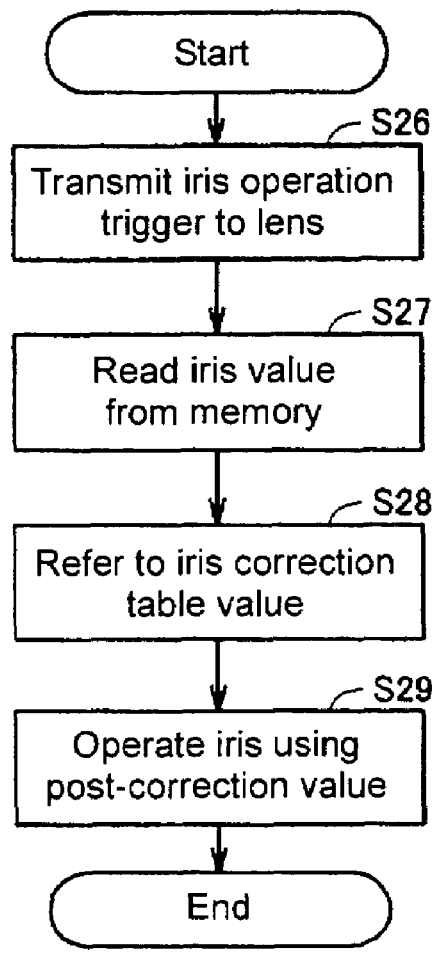
FIG. 15 shows a flowchart of an operation in the case where the lens unit 62 is driven based on the iris correction table value.

FIG. 15 shows a flowchart of an operation in the case where the lens unit 62 is driven based on the iris correction table value.

Referring to FIG. 15, the controller 20 transmits the trigger signal of the iris operation to the lens unit 62 in Step S26, and the controller 20 reads the iris value from the memory 225 in Step S27. The user can input the iris value through the external I/F 23 or handling I/F 27 of FIG. 3. Then, in Step S28, the controller 20 or the imaging device 60 refers to the iris correction table value of the imaging device 60. In Step S29, the operation control unit 90 drives the motor 623 such that the lens unit 62 becomes the post-correction iris value.

Therefore, even if the iris value actually realized by the iris setting value is shifted due to the variation in characteristics of the lens unit, the iris value which should originally be set as well as the iris value is set is actually obtained by the correction process.

Figure 16:
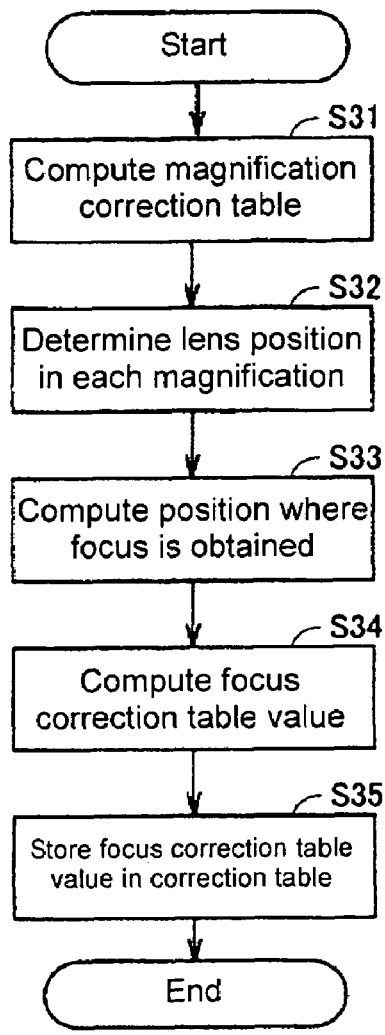
FIG. 16 shows a flowchart of an operation in the case where a focus correction table value is previously set in the lens unit 62.

FIG. 16 shows a flowchart of an operation in the case where a focus correction table value is previously set in the lens unit 62.

Referring to FIG. 16, the magnification correction table is computed in Step S31 (see Step S24 of FIG. 13 and description of FIG. 14). The position of the lens 624 is determined in each magnification in Step S32, and the position where the focus is obtained in each magnification is computed in Step S33. The setting lens position and the focus lens position can be sampled at plural points in Step S32 and S33. The focus correction table value is computed based on the sampling points in Step S34, and the focus correction table value is stored in the correction table 95 in Step S35.

Figure 19:
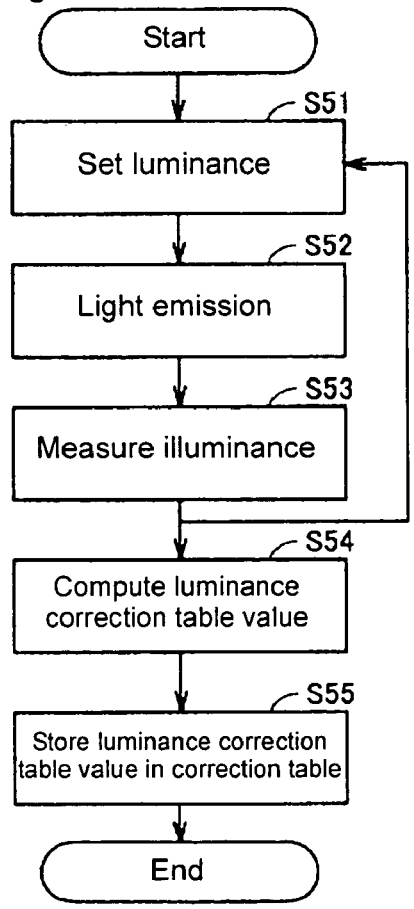
FIG. 19 shows a flowchart of an operation in the case where a luminance correction table value is previously set in an illumination unit 63.

Referring to FIG. 19, a luminance of the illumination unit 63 is set in Step S51, and an illuminator 632 emits light in Step S52. Then, an illuminance of the illuminator 632 is measured on predetermined conditions in Step S53. A conversion illuminance of setting luminance and a measured illuminance can be sampled at plural points by repeating the operations of Steps S51 to S53. In Step S54, the luminance correction table value is computed based on the sampling points. In Step S55, the luminance correction table value is stored in the correction table 95.

Figure 17:
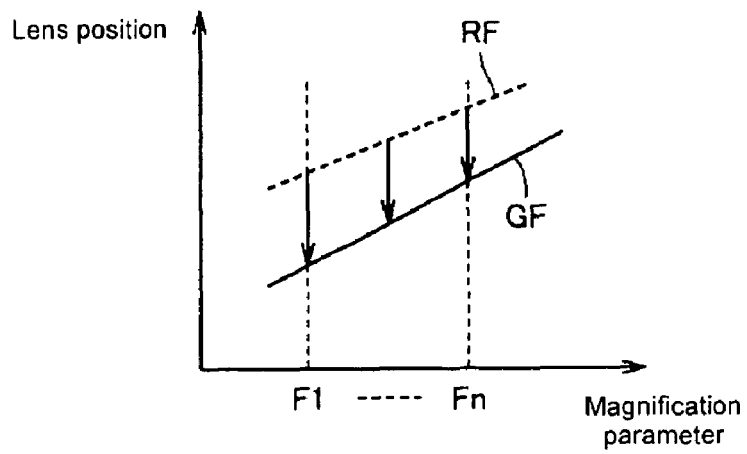
FIG. 17 shows an example in which the focus correction table value is computed in Step S34 of FIG. 16.

FIG. 17 shows an example in which the focus correction table value is computed in Step S34 of FIG. 16.

In FIG. 17, a horizontal axis indicates a magnification parameter while a vertical axis indicates a lens position. A setting lens position GF and a focus lens position RF is measured in each of sampling points F1 to Fn. The focus correction table value can be computed (Step S34) by computing a difference between the setting lens position GF and the focus lens position RF. In FIG. 17, an offset value between the setting lens position GF and the focus lens position RF becomes the focus correction table value.

Figure 18:
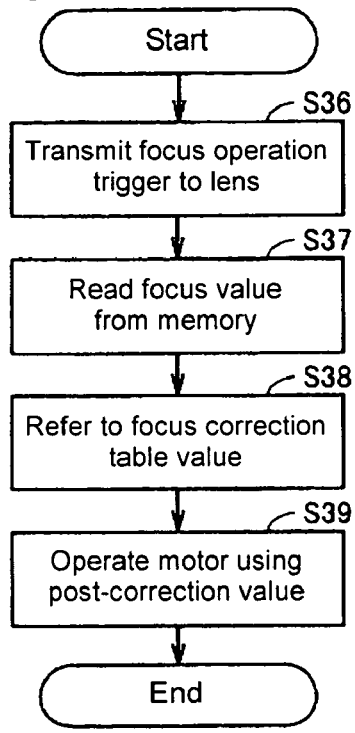
FIG. 18 shows a flowchart of an operation in the case where the lens unit 62 is driven based on the focus correction table value.

FIG. 18 shows a flowchart of an operation in the case where the lens unit 62 is driven based on the focus correction table value.

Referring to FIG. 18, the controller 20 transmits the trigger signal of the focus operation to the lens unit 62 in Step S36, and the controller 20 reads the focus value (lens position) from the memory 225 in Step S37. The user can input the focus value through the external I/F 23 or handling I/F 27 of FIG. 3. Then, in Step S38, the controller 20 or the imaging device 60 refers to the focus correction table value of the imaging device 60. In Step S39, the operation control unit 90 drives the motor 623 such that the lens unit 62 becomes the post-correction focus value.

Therefore, even if the focus value actually realized by the setting value of the focus value (lens position) is shifted due to the variation in characteristics of the lens unit, the focus value which should originally be set as well as the focus value is set is actually obtained by the correction process.

FIG. 19 shows a flowchart of an operation in the case where a luminance correction table value is previously set in the illumination unit 63.

Referring to FIG. 19, a luminance of the illumination unit 63 is set in Step S51, and an illuminator 632 emits light in Step S52. Then, an illuminance of the illuminator 632 is measured on predetermined conditions in Step S51. A conversion illuminance of setting luminance and a measured illuminance can be sampled at plural points by repeating the operations of Steps S51 to S53. In Step S54, the luminance correction table value is computed based on the sampling points. In Step S55, the luminance correction table value is stored in the correction table 95.

Figure 20:
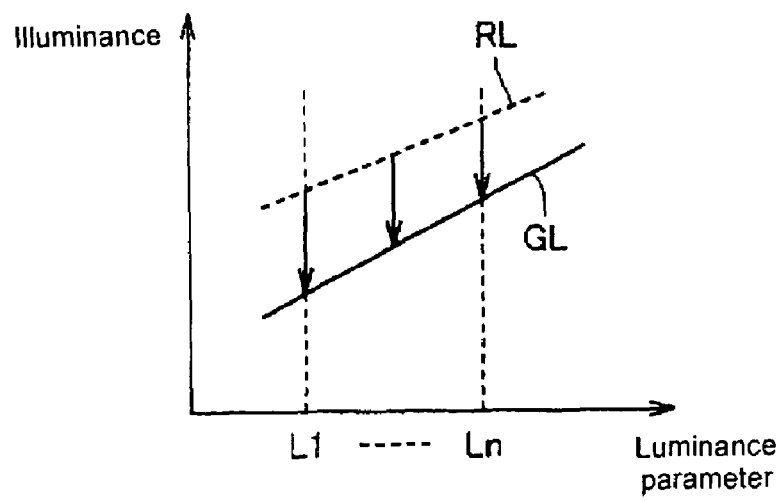
FIG. 20 shows an example in which the luminance correction table value is computed in Step S54 of FIG. 19.

FIG. 20 shows an example in which the luminance correction table value is computed in Step S54 of FIG. 19.

In FIG. 20, a horizontal axis indicates a luminance parameter while a vertical axis indicates illuminance. A measured illuminance RL corresponding to a conversion illuminance GL of the setting luminance is measured in each of sampling points L1 to Ln, and the linear or curved interpolation is performed between the conversion illuminance GL and the measured illuminance RL. The luminance correction table value can be computed (Step S54) by computing a difference between the conversion illuminance GL and the measured illuminance RL. In FIG. 20, an offset value between the conversion illuminance GL and the measured illuminance RL becomes the luminance correction table value. The term of "luminance" includes an amount corresponding to the luminance, and "luminance" is not necessarily expressed by a unit of luminance. The amount corresponding to the luminance shall mean an amount correlated with the luminance. For example, the amount corresponding to the luminance may be expressed by the illuminance on a predetermined condition (the same radiation angle, distance, and light acceptance area).

Figure 21:
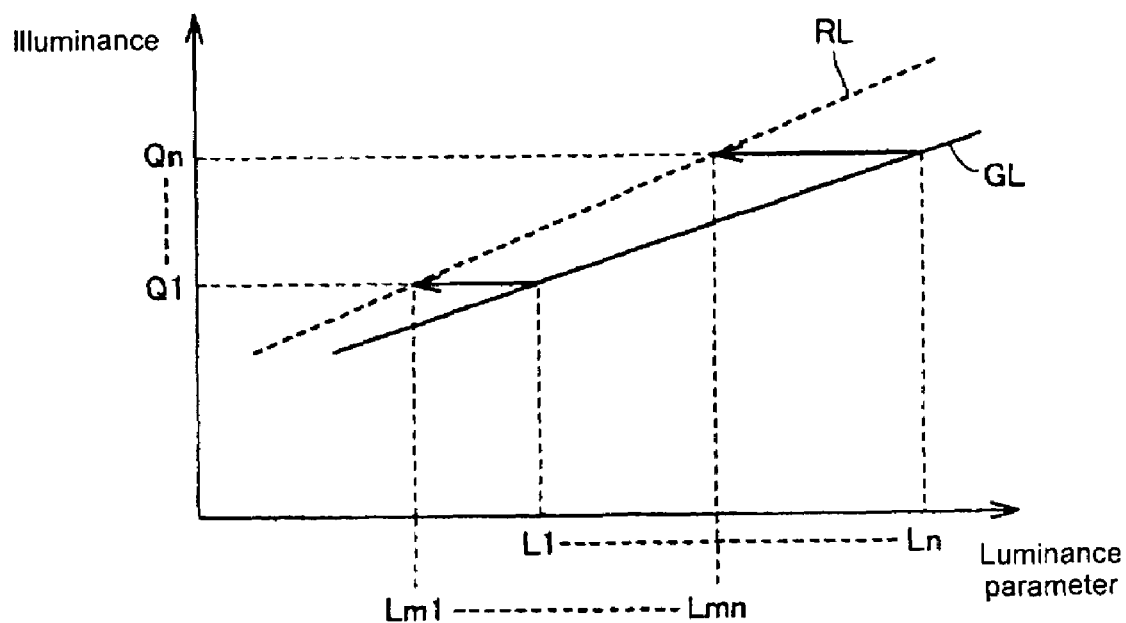
FIG. 21 shows the luminance which is corrected based on conversion illuminance GL computed in FIG. 20 and measured illuminance RL.

FIG. 21 shows the luminance which is corrected based on the conversion illuminance GL computed in FIG. 20 and the measured illuminance RL. FIG. 21 shows how the illuminance is corrected based on the conversion luminance GL computed in FIG. 20 and the measured luminance RL.

In FIG. 21, a horizontal axis indicates a luminance parameter while a vertical axis indicates the illuminance. As shown in FIG. 21, pre-correction luminance parameters L1 to Ln correspond to illuminances Q1 to Qn with respect to the straight line of the conversion luminance GL (target value) respectively. Post-correction luminance parameters Lm1 to Lmn are computed by applying the illuminances Q1 to Qn to the straight line of the measured luminance RL (actually measured value). That is, the correction table 95 of FIGS. 5 and 6 outputs the post-correction luminance parameters Lm1 to Lmn by receiving the pre-correction luminance parameters L1 to Ln to perform the above computation.

FIG. 22 shows a flowchart of an operation when the illumination unit 63 is driven based on the luminance correction table value.

Referring to FIG. 22, the controller 20 transmits a light emission pulse signal to the illumination unit 63 in Step S56, and the controller 20 reads the luminance from the memory 225 in Step S57. The user can input the luminance value through the external I/F 23 or handling I/F 27 of FIG. 3. Then, in Step S58, the controller 20 or the imaging device 60 refers to the luminance correction table value of the imaging device 60 from the correction table 95. In Step S59, the operation control unit 90 drives an illumination drive unit 631 such that the illuminator 632 becomes the post-correction luminance value.

Therefore, even if the luminance value actually realized by the luminance setting value is shifted due to the variation in characteristics of the illumination unit, the luminance value which should originally be set as well as the luminance value is set is actually obtained by the correction process. Similarly a value corresponding to the luminance may be used as the luminance, and the luminance may be expressed by the illuminance under the predetermined condition.

Thus, according to the embodiment of the invention, the imaging device 60 can be managed not in the manual manner but in the numerical manner, so that the same setting can easily be performed in the plural FA lines. The same setting can be recreated in replacing the camera, the illumination unit, and the like of the imaging device. In the case where the faulty setting is performed in maintenance, the faulty setting is easily found.

The embodiment is disclosed by way of example only, and the invention is not limited to the embodiment. The scope of the invention is shown by not the description of the embodiment but the appended claims, and various changes and modifications could be made without departing from the scope of the invention.

What is claimed is:

1. An image processing apparatus comprising an imaging device and a controller, wherein the imaging device includes:
    a lens unit which has at least one of a zoom function, a focal distance conversion function, and an iris function;
    an imaging unit which takes an image of a subject through the lens unit;
    an operation control unit which receives a setting value from the controller and performs control such that an operation condition of the corresponding function of the lens unit becomes an operation condition according to the setting value; and
    a correction table storage unit in which a correction value is stored, the correction value correcting a deviation between an operation condition which should be set by the setting value and an operation condition which actually set by the setting value in the imaging device, and
    the controller includes:
    a setting value storage unit in which the setting value for setting the operation condition of the function of the lens unit is stored; and
    an imaging device interface unit which outputs the setting value stored in the setting value storage unit to the operation control unit of the imaging device,
    wherein the operation control unit corrects the setting value received from the controller based on a correction value stored in the correction table storage unit, and controls the operation condition using the corrected setting value to thereby perform control in the operation condition which should be set by the setting value.

2. An image processing apparatus according to claim 1, wherein the imaging device further includes an illumination unit which has a function of adjusting a luminance,
    the operation control unit receives the setting value from the controller and performs the control such that the luminance of the illumination unit becomes an operation condition according to the setting value, and
    a setting value for setting the luminance of the illumination unit is stored in the setting value storage unit of the controller.

3. An image processing apparatus according to claim 1, wherein the controller includes an interface unit which accepts input of the setting value from external equipment.

4. An image processing apparatus according to claim 1, wherein,
    the controller receives the correction value stored in the correction table storage unit from the imaging device and corrects the setting value based on the correction value, and the corrected setting value is output through the imaging device interface unit to the operation control unit of the imaging device.

5. An image processing apparatus according to claim 1, wherein the imaging processing apparatus further comprising a plurality of the imaging devices, at least two of the imaging devices being connected to the controller image processing apparatus,
one, or at least two setting values are stored in the setting value storage unit of the controller, and
at least one setting value is commonly used as the setting value of the at least two imaging devices connected to the controller.

6. An image processing apparatus comprising an imaging device and a controller, wherein the imaging device includes:
an illumination unit which has a function of adjusting a luminance;
an imaging unit which takes an image of a subject;
an operation control unit which receives a setting value from the controller and performs control such that the luminance of the illumination unit becomes an operation condition according to the setting value; and
a correction table storage unit in which a correction value is stored, the correction value correcting a deviation between an operation condition which should be set by the setting value and an operation condition which actually set by the setting value in the imaging device, and
the controller includes:
a setting value storage unit in which the setting value for setting the luminance of the illumination unit is stored; and
an imaging device interface unit which outputs the setting value stored in the setting value storage unit to the operation control unit of the imaging device,
wherein the operation control unit corrects the setting value received from the controller based on a correction value stored in the correction table storage unit, and controls the operation condition using the corrected setting value to thereby perform control in the operation condition which should be set by the setting value.

7. A method for setting an operation condition for an image processing apparatus which an imaging device and a controller are connected to in a separable manner, the imaging device including first and second imaging devices,
the image processing apparatus operation condition setting method comprising:
a step of inputting a setting value from external equipment through an interface unit of the controller, to store the setting value in a setting value storage unit of the controller while the first imaging device is connected the controller, and of controlling the function of a lens unit of the first imaging device based on the setting value such that the function of the lens unit of the first imaging device becomes the operation condition according to the setting value of the operation condition, the lens unit of the first imaging device having at least one of a zoom function, a focal distance conversion function, and an iris function;
a step of disconnecting the first imaging device from the controller and replacing the first imaging device with the second imaging device to connect;
a step of controlling the function of the lens unit of the second imaging device such that the function of the lens unit of the second imaging device becomes the operation condition according to the same setting value as the setting value of the operation condition of the function of the lens unit of the first imaging device, the setting value of the operation condition of the function of the lens unit of the first imaging device being recorded in the setting value storage unit of the controller; and
a step of correcting, by an operation control unit of the imaging device, the setting value received from the controller based on a correction value stored in a correction table storage unit, and controlling the operation condition using the corrected setting value, and
wherein the correction value corrects a deviation between an operation condition which should be set by the setting value and an operation condition which is actually set by the setting value in the imaging device.

8. An image processing apparatus operation condition setting method according to claim 7, further comprising:
a step of receiving, by an operation control unit of the imaging device, the setting value from the controller and performing the control such that the operation condition for a luminance of an illumination unit of the imaging device becomes an operation condition according to the setting value, the illumination unit having a function of adjusting the luminance,
a step of setting a setting value for setting the luminance of the illumination unit and storing the setting value in the setting value storage unit of the controller,
a step of controlling the operation condition of the illumination unit based on the setting value such that the luminance of the illumination unit of the first imaging device becomes the luminance according to the setting value; and
a step of controlling the operation condition concerning the luminance of the illumination unit of the second imaging device such that the operation condition concerning the luminance of the illumination unit of the second imaging device becomes the operation condition according to the same setting value as the setting value of the operation condition concerning the luminance of the illumination unit of the first imaging device, the setting value of the operation condition concerning the luminance of the illumination unit of the first imaging device being recorded in the setting value storage unit of the controller.

9. An image processing apparatus operation condition setting method according to claim 7, further comprising:
a step of receiving, by the controller, the correction value stored in a correction table storage unit from the imaging device and correcting the setting value based on the correction value, and
a step of outputting the corrected setting value through the imaging device interface unit to the operation control unit of the imaging device,
wherein the correction value corrects a deviation between an operation condition which should be set by the setting value and an operation condition which is actually set by the setting value in the imaging device.

* * * * *